United States Patent
Jennings et al.

(10) Patent No.: US 8,301,880 B2
(45) Date of Patent: Oct. 30, 2012

(54) CERTIFICATE ENROLLMENT WITH PURCHASE TO LIMIT SYBIL ATTACKS IN PEER-TO-PEER NETWORK

(75) Inventors: Cullen F. Jennings, Santa Cruz, CA (US); Jonathan D. Rosenberg, Freehold, NJ (US); Radha Venkatesh, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 442 days.

(21) Appl. No.: 12/614,671

(22) Filed: Nov. 9, 2009

(65) Prior Publication Data
US 2011/0113238 A1    May 12, 2011

(51) Int. Cl.
*H04L 29/06* (2006.01)
(52) U.S. Cl. .............................. 713/156; 713/176; 726/3
(58) Field of Classification Search .......... 713/156–158, 713/176; 709/223–224, 249–250; 726/2–4
See application file for complete search history.

(56) References Cited

U.S. PATENT DOCUMENTS

| | | | | |
|---|---|---|---|---|
| 2002/0161997 | A1* | 10/2002 | Yamasaki et al. | 713/150 |
| 2003/0167392 | A1* | 9/2003 | Fransdonk | 713/156 |
| 2005/0044016 | A1* | 2/2005 | Irwin et al. | 705/30 |
| 2005/0080746 | A1* | 4/2005 | Zhu et al. | 705/59 |
| 2007/0016785 | A1* | 1/2007 | Guay et al. | 713/176 |
| 2007/0022469 | A1* | 1/2007 | Cooper et al. | 726/3 |
| 2007/0220575 | A1* | 9/2007 | Cooper et al. | 725/118 |
| 2011/0302412 | A1* | 12/2011 | Deng et al. | 713/159 |

OTHER PUBLICATIONS

J. Douceur. The Sybil Attack. In Proc. Intl Wkshp on Peer-to-Peer Systems (IPTPS), Mar. 2002, 6 pages.*
Levine, Brian Neil, Shields, Clay, Margolin, N. Boris, A Survey of Solutions to the Sybil Attack, downloaded Oct. 27, 2009, pp. 1-11, University of Massachusetts, available at http://prisms.cs.umass.edu. Steam, downloaded Oct. 28, 2009, pp. 1-12, Wikipedia, available at http://en.wikipedia.org.

* cited by examiner

*Primary Examiner* — Hadi Armouche
(74) *Attorney, Agent, or Firm* — Brinks Hofer Gilson & Lione

(57) ABSTRACT

A system may protect against Sybil attacks on a peer-to-peer (P2P) network based on each one the nodes in the P2P network being identified by a corresponding certificate. In particular, a node may receive a license key, where the license key is evidence of a purchased product license. The node may transmit a message included in the license key to a certificate authority. The node may receive a certificate from the certificate authority in response to authentication of the message. The node may be identified in the P2P network with a node identifier included in the certificate.

20 Claims, 3 Drawing Sheets

CERTIFICATE ENROLLMENT WITH PURCHASE TO LIMIT SYBIL ATTACKS IN PEER-TO-PEER NETWORK

TECHNICAL FIELD

The present disclosure relates generally to peer-to-peer networks and, in particular, to security of peer-to-peer networks.

BACKGROUND

A peer-to-peer (P2P) network may have security flaws through which an attacker may compromise the network. The Sybil attack is a well-known attack on P2P networks. In a Sybil attack, the attacker may introduce a large number of nodes into the P2P network such that many messages passing through the P2P network will pass through at least one of the nodes controlled by the attacker. Because the messages pass through the attacker's nodes, the attacker may drop messages, forge responses, and, in general, take over the P2P network.

BRIEF DESCRIPTION OF THE DRAWINGS

The components and the figures are not necessarily to scale, emphasis instead being placed upon illustrating the principles of the example embodiments. Moreover, in the figures, like-referenced numerals designate corresponding parts throughout the different views.

DESCRIPTION OF EXAMPLE EMBODIMENTS

Overview

Figure 1:
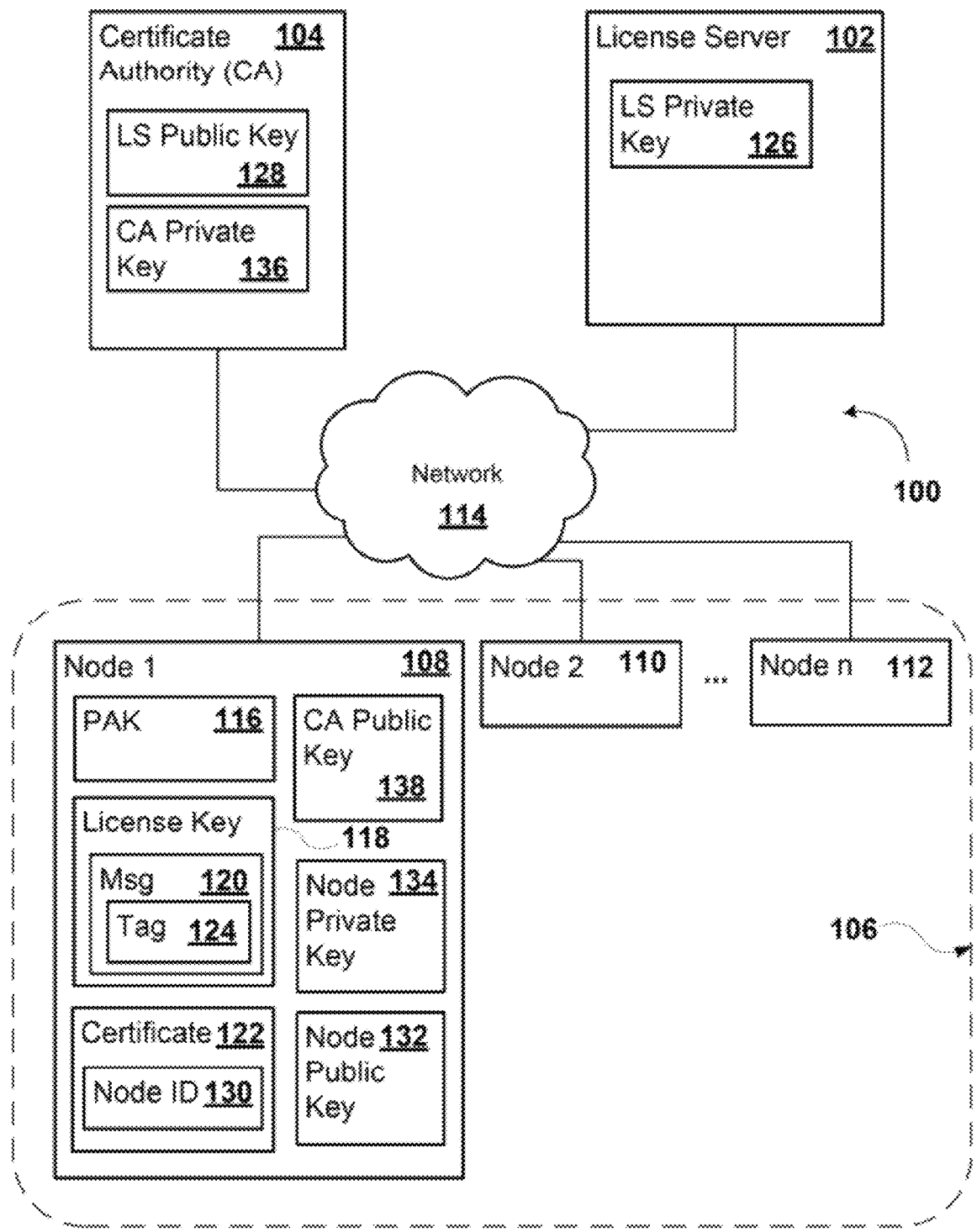
FIG. 1 illustrates one embodiment of a system to protect against Sybil attacks.

By way of introduction, the example embodiments described below include a system, logic encoded in a computer readable media, and a method to protect against Sybil attacks on a peer-to-peer (P2P) network. A certificate for each node in the P2P network is required in order for the node to operate. The nodes may use a license server loosely coupled with a certificate authority to efficiently generate the certificates for the nodes and to ensure the uniqueness of the certificates used by the nodes.

According to a first aspect, a system may receive, at a node on a peer-to-peer (P2P) network, a license key, where the license key is evidence of a purchased product license. The system transmits a message included in the license key to a certificate authority from the node. The system may receive, at the node, a certificate from the certificate authority in response to authentication of the message. The system identifies the node in the P2P network with a node identifier included in the certificate. The system may verify identities of nodes in the P2P network that communicate with the node based on certificates received from the nodes.

In a second aspect, logic is provided in a computer readable media. The logic, when executed, store a license key in a node of a peer-to-peer (P2P) network, where the license key is proof of purchase of a product license of a product associated with the node. The logic may transmit a message included in the license key to a certificate authority from the node. The logic may receive, at the node, a certificate from the certificate authority in response to authentication of the message. The logic may identify the node in the P2P network with a node identifier included in the certificate. The logic may verify identities of a plurality of nodes in the P2P network that communicate with the node based on certificates received from the nodes In a third aspect, a method is provided. A license key is received from a license server at a node, where the license key is proof of purchase of a product. A message included in the license key is transmitted to a certificate authority from the node. A certificate is received at the node from the certificate authority in response to authentication of the message. The node may be identified in the P2P network based on the certificate. Connections to the node may be accepted only from nodes in the P2P network that transmit valid certificates to the node.

The present invention is defined by the following claims, and nothing in this section should be taken as a limitation on those claims. Further aspects and advantages of the invention are discussed below in conjunction with the example embodiments.

Example Embodiments

One solution suggested for limiting Sybil attacks on a P2P network is trusted certification. Trusted certification relies on a centralized authority that ensures each entity is assigned exactly one identity, as indicated by possession of a certificate.

However, trusted certification is known to have security and performance problems. There are no known methods of ensuring each entity is assigned exactly one identity, other than through a manual or in-person process. This may be costly or create a performance bottleneck in large-scale systems. Moreover, identities may be lost or stolen. Obtaining a certificate may be inexpensive, providing little resistance to the Sybil attacker. Furthermore, P2P networks that provide anonymity between peer nodes may lose anonymity if a node presents a certificate to a compromised node when opening a connection and the certificate identifies an individual or organizational identity using the presenting node.

In one example embodiment, a system protects against Sybil attacks on a P2P network by each one of the nodes in the P2P network obtaining a respective certificate in exchange for purchasing a respective license for a product. For example, a node in the P2P network may receive a license key in exchange for a purchase of a license to use a software product at the node. The license key or a portion thereof may be digitally signed by a license server. The node may present the license key, or the portion thereof, to a certificate authority in order to obtain a certificate that identifies the node. The certificate may identify the node by including a node identifier, such as a globally unique identifier (GUID). Thus, each one of the nodes in the P2P network may obtain a unique certificate that is tied to a particular purchased license, thereby ensuring each one of the nodes is assigned exactly one identity using a mechanism that is cost effective and scales well. By limiting identification information in the certificate to the node identifier, anonymity between the nodes in the P2P network may be maintained.

FIG. 1 illustrates one embodiment of a system 100 to protect against Sybil attacks. The system 100 may include a license server 102, a certificate authority 104, and a P2P network 106 comprised of multiple nodes, 108, 110, and 112. The nodes, 108, 110, and 112, may be in communication with each other over a network 114. The system 100 may include additional, fewer, or different components. For example, the license server 102 and the certificate authority 104 may be combined into one server. In one example, the system 100 may include the network 114 as well as the nodes, 108, 110, and 112. In a second example, the system 100 may include neither the certificate authority 104 nor the license server 102 and only one of the nodes, 108, 110, and 112.

The P2P network 106 may be any distributed network comprising nodes, 108, 110, and 112, that make a portion of the nodes' resources, such as processing power, disk storage or network bandwidth, available to other nodes, 108, 110, and 112, without a need for central coordination of the nodes, 108, 110, and 112. For example, the P2P network 106 may be defined by a distributed hash table (DHT) for storing and retrieving data. The nodes, 108, 110, and 112, also known as peers, may be both suppliers and consumers of resources, in contrast to the traditional client-server model where servers supply, and clients consume. The nodes, 108, 110, and 112, of the P2P network 106 may communicate with each other over the network 114 using any suitable P2P protocol, such as Chord, CAN (Content Addressable Network), Bamboo, and Kademlia. The network 114 may be a Local Area Network (LAN), a Wireless Local Area Network (WLAN), a Personal Area Network (PAN), a Wide Area Network (WAN), the Internet, or any other communications network. Other P2P network arrangements and/or node capabilities may be used.

Each one of the nodes, 108, 110, and 112, may be any process, device, or any combination thereof, that may participate as a peer in the P2P network 106. Examples of the nodes, 108, 110, and 112, include, but are not limited to, a computer, a laptop, a blade server, a call agent, a soft switch, an Internet Protocol Private Branch Exchange (IP-PBX), a hosting call manager application, such as Cisco Call Manager (CCM), an IP to IP gateway, such as a Session Border Controller (SBC) or Back-to-Back User Agent (B2BUA), a firewall, or border router.

The license server 102 may be any process, device, or combination thereof that may issue a license key, which may be used as proof of purchase of a license. The certificate authority 104 may be any process, device, or combination thereof that may issue a certificate that identifies one of the nodes, 108, 110, and 112. In one embodiment, the license server 102 and certificate authority 104 are servers or other processors with encoded logic. The license server 102 and certificate authority 104 may be peers in the P2P network 106 or separate devices operating on a client-server basis for the nodes.

During operation, a node 108 that is to join the P2P network 106 may transmit a product activation key 116 to the license server 102 as evidence of having purchased a product. The product may be purchased at a store or downloaded from a network. The product purchased may be software that uses the P2P network 106, a device that uses the P2P network 106, or any other product of value, such as a specialized certificate for use strictly with the P2P network 106 that is 100 times the cost of a typical web certificate. The node 108 may receive a license key 118 from the license server 102 if the license server 102 successfully validates the product activation key 116. The license key 118 may be any data structure that indicates a product was purchased.

In one example, the license server 102 may collect information about the purchaser and associate that information with the license key 118. In a second example, the license server may not associate any information with the license key 118.

In a different example, a user may enter the product activation key 116 into a web site and receive the license key 118 from the license server 102. For example, the license server 102 may e-mail the license key 118 to the user in response to successfully verifying the product activation key 116. The license server 102 may verify the product activation key 116 based on a database populated with product activation keys distributed with purchased products. The user may store the license key 118 received from the license server 102 in the node 108. In yet another example, any mechanism for obtaining a license key 118 may be used for the node 108 to obtain the license key 118.

The license key 118 may include a message 120. The message 120 may be any data structure that the certificate authority 104 may use to determine whether to generate a certificate 122 for the node 108. For example, the message 120 may include a tag 124 and be digitally signed by the license server 102. The tag 124 may be a unique identifier specific to the purchased license. For example, the tag 124 may be a random number large enough that the chance of any two tags being the same is vanishingly small. For example, the tag 124 may be a random 128-bit number. In one example, the message 120 may include information that the certificate authority 104 may use in generating the certificate 122, such how long the certificate is to be valid for. In one example, the message 120 may be the entire license key 118.

The license server 102 may have cryptographically signed the message 120 using a license server private key 126. A corresponding license server public key 128 may be known to the certificate authority 104. For example, an administrator of the license server 102 may have previously emailed a copy of the license server public key 128 to an administrator of the certificate authority 104.

To obtain the certificate 122, the node 108 may transmit the message 120 to the certificate authority 104. In one example, the node 108 may transmit the message 120 to the certificate authority 104 over a transport layer security (TLS) connection that the node 108 established with the certificate authority 104.

Upon receipt of the message 120, the certificate authority 104 may verify the authenticity and integrity thereof. For example, the certificate authority 104 may use the license server public key 128 to verify that the message 120 was signed by the license server 102 and that the contents of the message 120 have not been altered. Alternatively or in addition, the message 120 may be encrypted by the license server 102 using a symmetric key encryption and the certificate authority 104, knowing the symmetric key, may decrypt the message.

In addition to verifying the authenticity and integrity of the message 120, the certificate authority 104 may determine whether the certificate authority 104 has already issued the certificate 122 for the tag 124 included in the message 120. If so, the certificate authority 104 may not issue the certificate 122 to the node 108. However, if the certificate authority 104 has not yet issued the certificate 122 for the tag 124, then the certificate authority 104 may generate the certificate 122 and transmit the certificate 122 to the node 108. The certificate authority 104 may keep track of which tags the certificate authority 104 has issued certificates for in order to prevent issuing multiple certificates for one tag 124.

When generating the certificate 122, the certificate authority 104 may limit the identifying information in the certificate 122 to a node identifier 130. The node identifier 130 may uniquely identify the node 108 among the nodes 108, 110, and 112 of the P2P network 106. For example, the node identifier 130 may be globally unique identifier, a random number, or any other value that may uniquely identify the node 108 among the nodes 108, 110, and 112 of the P2P network 106.

The certificate 122 may be any data structure that uses a digital signature to bind together a public key with an identity. In particular, the certificate 122 may bind together the node identifier 130 with a node public key 132. For example, the certificate 122 may conform to the X.509 standard as set forth by the ITU-T (Telecommunication Standardization Sector) standard or to any other certificate standard or proprietary format. In one example, the node 108 may generate the node public key 132 and a corresponding node private key 134. The node 108 may transmit the node public key 132 to the certificate authority 104 so that the certificate authority may include the node public key 132 in the certificate 122. In a second example, the certificate authority 104, not the node 108, generates the node public key 132 and the node private key 134. In the second example, the certificate authority 104 may transmit the node public key 132 and the node private key 134 to the node 108 when transmitting the certificate 122. In both the first example and the second example, the certificate authority 104 may generate the digital signature of the certificate 122 using a certificate authority private key 136. In still another example, the node 108 may self-sign the certificate 122 using a web of trust mechanism.

As indicated above, the certificate authority 104 may limit the identifying information in the certificate 122 to a node identifier 130 or to the node identifier 130 and the node public key 132. The purchaser identify is not revealed in the certificate 122. Therefore, information common to public key encryption infrastructure (PKI) certificates, such as individual names or organization names may not be included in the certificates issued by the certificate authority 104 to the nodes 108, 110, and 112. If the certificate 122 is an X.509 certificate, the certificate authority 104 may populate, for example, a Common Name (CN) in a Subject field of the certificate 122, with the node identifier 130. Alternatively or in addition, the certificate authority 104 may populate a Subject Alternative Name (SAN) field of the certificate 122 with the node identifier 130. Alternatively, the certificate authority 104 may include additional identifying information in the certificate 122, such as an organization name. Limiting the identity information in the certificate 122 provides a degree of anonymity between the nodes 108, 110, and 112. In contrast, however, the license server 102 and certificate authority 104 may determine substantial identifying information given just the node identifier 130 if desired.

Thus, obtaining the certificate 122 depends on obtaining the message 120 that is properly signed or encrypted; obtaining the message 120 depends on receiving the license key 118; and receiving the license key 118 depends on purchasing the product. Consequently, each one of the nodes 108, 110, and 112 may be ensured exactly one respective identity and a corresponding certificate. Additionally, a financial cost is imposed in order for one of the nodes 108, 110, and 112 to receive a corresponding certificate.

The certificate authority 104 and the license server 102 may share little information. For example, the certificate authority 104 and the license server 102 may share a symmetric key or asymmetric keys, such as the license server public key 128. The certificate authority 104 does not need to have order information, license keys, or a list of valid tags. Similarly, the license server 102 does not need to maintain any certificate information. Consequently, the certificate authority 104 may be administered by an organization different than the organization administering the license server 102. For example, a company specializing in granting certificates may administer the certificate authority 104 while a company specializing in selling products may administer the license server 102. However, the certificate authority 104 and the license server 102 may share as much information as desired. For example, the license server 102 may transmit valid tags to the certificate authority 104 for use in verifying the messages received from the nodes 108, 110, and 112. A same entity may provide both the license server 102 and the certificate authority 104.

Use of the product activation key 116 may be eliminated. For example, the license server 102 may collect payment from the node 108 and, in response, transmit the license key 118 to the node 108 without requiring presentment of the product activation key 116.

In one example, the tag 124 may be the same as the node identifier 130. The license server 102 may generate the node identifier 130 and include the node identifier 130 as the value of the tag 124. The certificate authority 104 may then use the node identifier 130 included in the message 120 received from the node 108 to generate the certificate 122.

After the node 108 receives the certificate 122, the node 108 may present the certificate 122 to the existing nodes 110 and 112 in order for the existing nodes 110 and 112 to validate the identity of the node 108. The validation of the identity of the node 108 may be performed at various times. In one example, whenever the node 108 joins the P2P network 106 by establishing a connection to one of the existing nodes 110 and 112, the existing node 110 or 112 may require the node 108 to present the certificate 122. The existing node 110 or 112 may verify the certificate 122 using a certificate authority public key 138. For example, the node 108 may present the certificate 122 when opening a TLS connection to the existing node 110 or 112. Examples of the connection include TLS connections, Hypertext Transfer Protocol (HTTP) connections, or any other suitable computer network protocol connection.

In a second example, whenever the node 108 accesses resources provided by the P2P network 106, the existing node 110 or 112, from which the resources are requested, may verify the certificate 122 using the certificate authority public key 138. For example, whenever the node 108 stores or retrieves values in a distributed hash table maintained in the P2P network 106, the existing node 110 or 112 that is to store the value or that is to retrieve the value may verify the certificate 122.

If the node 108 legitimately receives the certificate 122 from the certificate authority 104, but the node 108 is malicious or compromised, the certificate 122 may be cloned and used to attempt to add illegitimate nodes to the P2P network 106. In one example, to limit the effect of the illegitimate nodes, each one of the existing nodes 110 and 112 may accept only one connection per certificate. For example, the existing node 110 or 112 may drop an existing connection from a first node that presented the certificate 122 if the existing node 110 or 112 receives a request for a connection from a second node that presents the same certificate 122. Alternatively, the existing node 110 or 112 may maintain an existing connection from a first node that presented the certificate 122, but refuse a connection request from a second node that presents the certificate 122.

In a second example, to limit the effect of the illegitimate nodes, the resources of the P2P network 106 may be limited on a per certificate basis. For example, if the P2P network 106 provides storage of values, the existing node 110 or 112 may enforce a storage space quota for each certificate 122. In an illustrative example, the node 108 may store a phone number and a network address in the P2P network 106, whereby the node 108 indicates Voice over Internet Protocol (VoIP) calls to the phone number may be handled by a VoIP call agent at the network address. The P2P network 106 may permit, for example, only one network address per certificate to be stored in the P2P network 106. Alternatively or in addition, the P2P network 106 may limit the number of phone numbers that may be stored in the P2P network 106 to a predetermined number of phone numbers for any one certificate regardless of the number of nodes using the certificate 122.

The certificate 122 may be configured to expire. In an example where the certificate 122 may expire, the node 108 may re-transmit the message 120 included in the license key 118 to the certificate authority 104 within a predetermined period of time before or after the certificate 122 expires. The certificate authority 104 may thereupon re-issue the certificate 122 with a new expiration date.

The certificate authority 104 may revoke particular certificates. For example, the certificate 104 may be revoked after the certificate 104 is known to be stolen. The nodes 108, 110, and 112 may receive a certificate revocation list from the certificate authority 104. When validating any certificate, the nodes 108, 110, and 112 may check the certificate against the certificate revocation list. The nodes 108, 110, and 112 may verify a received certificate 122 with the certificate authority 104. The certificate authority 104 may track usage of a certificate in order to identify anomalies and revoke the certificate 122.

In one example, the certificate authority 104 may be configured to issue a limited number of certificates per year, month, week, or other time frame. Alternatively or in addition, the certificate authority 104 may be configured to check the number of new tags received from the nodes 108, 110, and 112 against a total number of new tags generated at the license server 102.

Figure 2:
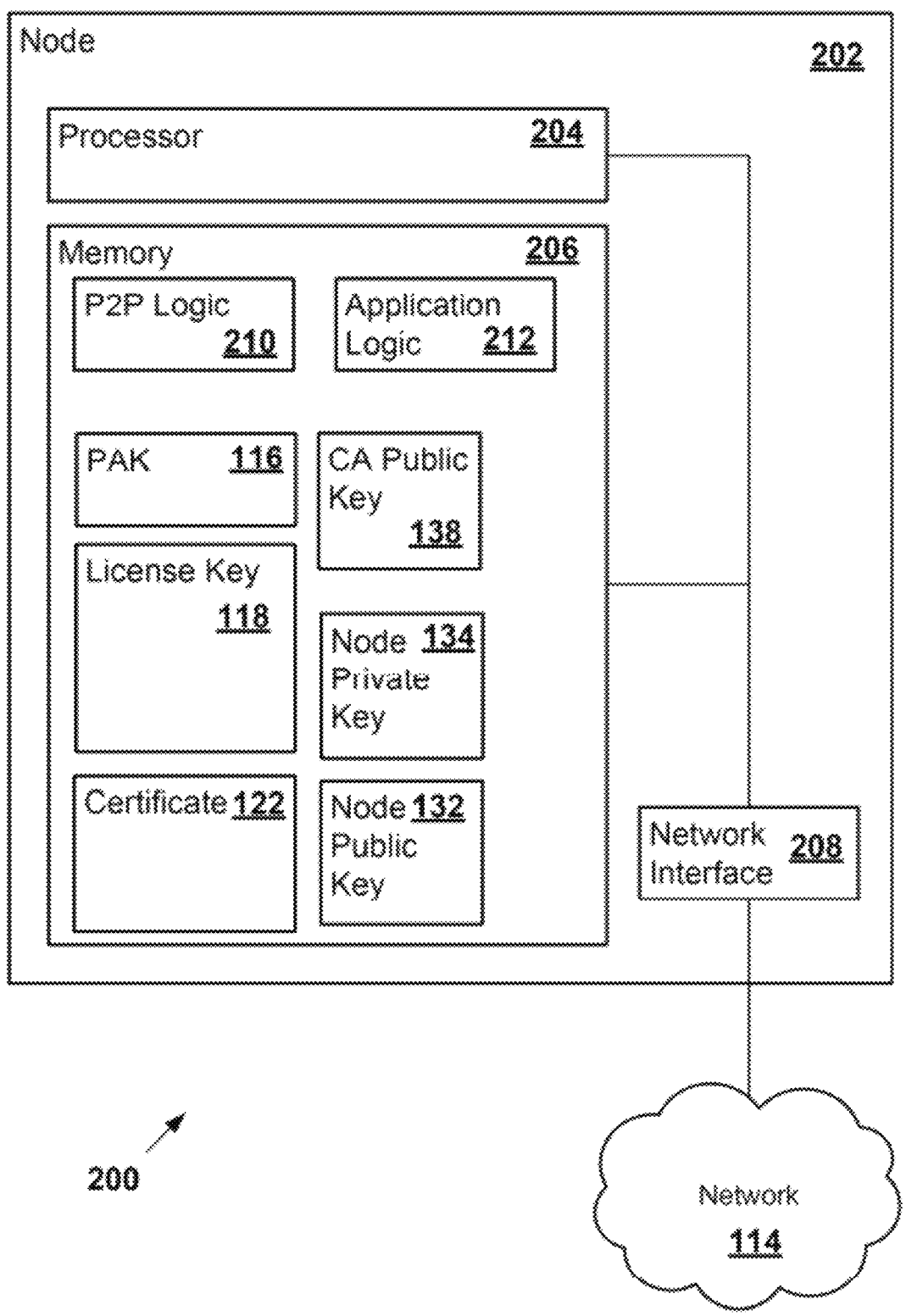
FIG. 2 illustrates a hardware diagram of an example node in the P2P network that may implement the system to protect against Sybil attacks.

FIG. 2 illustrates a hardware diagram 200 of an example node 202 in the P2P network 106 that may implement the system 100 to protect against Sybil attacks. The example node 202 includes a processor 204, memory 206, and a network interface 208. The memory 206 stores the programs and processes that implement the logic described above for execution by the processor 204. As examples, the memory 206 may store program logic that implements a portion of the P2P network 106 on the example node 202 and application logic that makes use of the P2P network 106, such as P2P logic 210 and application logic 212, respectively. The memory 206 may store any data structures used by the program logic such as the PAK 116, the license key 118, and the certificate 122. The example node 202 may receive data, such as the license key 118 and the certificate 122, over the network interface 208.

The example node 202 and the system 100 may be implemented in many different ways. For example, although some features are shown stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network. Although the program logic, such as the P2P logic 210 and the application logic 212, may be software executable with the processor 204, the program logic may be implemented as an application specific integrated circuit (ASIC).

The example node 202 and the system 100 may be implemented with additional, different, or fewer entities. As one example, the processor 204 may be implemented as a microprocessor, a microcontroller, a DSP, an application specific integrated circuit (ASIC), discrete logic, or a combination of other types of circuits or logic. As another example, the memory 206 may be a non-volatile and/or volatile memory, such as a random access memory (RAM), a read-only memory (ROM), an erasable programmable read-only memory (EPROM), flash memory, any other type of memory, or any combination thereof. The memory 206 may include an optical, magnetic (hard-drive) or any other form of data storage device.

The processing capability of the example node 202 and the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system 100.

The processor 204 may be in communication with the memory 206 and the network interface 208. In one example, the processor 204 may also be in communication with additional elements, such as a display. The processor 204 may be a general processor, central processing unit, server, application specific integrated circuit (ASIC), digital signal processor, field programmable gate array (FPGA), digital circuit, analog circuit, or combinations thereof.

The processor 204 may be one or more devices operable to execute computer executable instructions or computer code embodied in the memory 206 or in other memory to implement the system 100. The computer code may include instructions executable with the processor 204. The computer code may include embedded logic. The computer code may be written in any computer language, such as C++, C#, Java, Pascal, Visual Basic, Perl, HyperText Markup Language (HTML), JavaScript, assembly language, shell script, or any combination thereof. The computer code may include source code and/or compiled code.

The network interface 208 may include hardware, software, or a combination of hardware and software that facilitates communication over the network 114. The network interface 208 provides physical access to the network 114 and may provide a low-level addressing system through the use of Media Access Control (MAC) addresses.

The license server 102 and the certificate authority 104 may include a memory and a processor, such as the memory 206 and the processor 204 of the example node 202. The license server 102 and the certificate authority 104 may include software, hardware, or any combination thereof.

Figure 3:
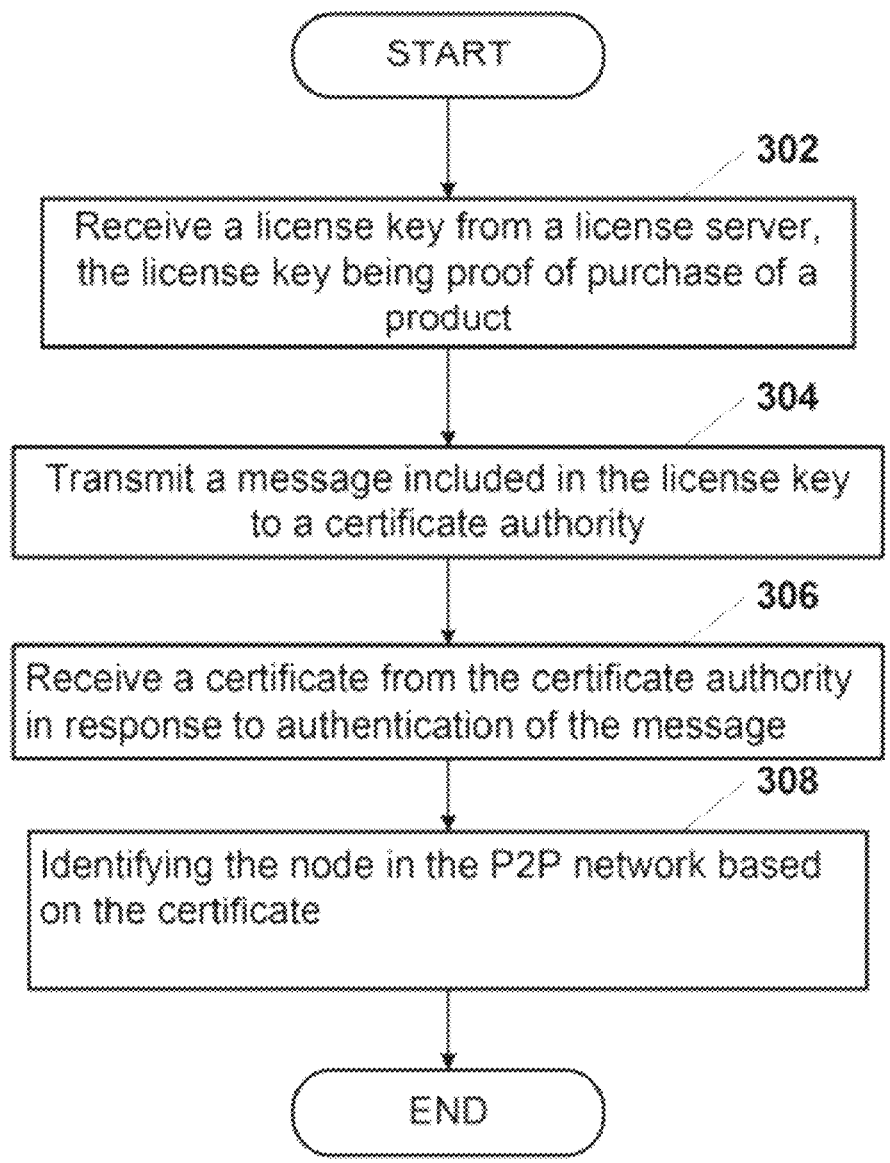
FIG. 3 illustrates a flow diagram of example logic of the system to protect against Sybil attacks.

FIG. 3 illustrates a flow diagram of example logic of the system 100 to protect against Sybil attacks. Additional, different, or fewer blocks may be included in the logic of the system 100. The blocks may be performed in the order shown or a order different than illustrated in FIG. 3.

In block 302 of the example illustrated in FIG. 3, the operation may begin by receiving, at the node 108, the license key 118 from the license server 102, where the license key 118 is proof of purchase of a product. For example, a user may submit the product activation key 116 to the license server 102, and receive the license key 118 in exchange. In a different example, the node 108 may transmit the product activation key 116 and registration information to the license server 102, and receive the license key 118 in response to the license server 102 validating the product activation key 116.

The operation may continue at block 304 by transmitting the message 120 included in the license key 118 from the node 108 to the certificate authority 104. In response to authentication of the message 120 at the certificate authority 104, the operation may continue at block 306 by receiving, at the node 108, the certificate 122, wherein the certificate is proof of an identity of the node 108.

The operation may continue at block 308 by identifying the node 108 in the P2P network 106 based on the certificate 122. For example, identifying the node in the P2P network may include extracting the node identifier 130 from the certificate and configuring the identity of the node in the P2P network as the node identifier.

The operation may end, for example, by the node 108 using the resources provided by the P2P network 106. As another example, the operation may end by accepting connections to the node 108 only from nodes in the P2P network 106 that transmit valid certificates to the node 108.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the embodiments have been described above by reference to various examples, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
   a memory; and
   a processor in communication with the memory, the memory including computer code executable with the processor, wherein the computer code is configured to:
   receive, at a node on a peer-to-peer (P2P) network, a license key, the license key being evidence of a purchased product license;
   transmit a message included in the license key to a certificate authority from the node;
   receive, at the node, a certificate from the certificate authority in response to authentication of the message;
   identify the node in the P2P network with a node identifier included in the certificate; and
   verify identities of a plurality of nodes in the P2P network that communicate with the node based on certificates received from the nodes.

2. The system of claim 1, wherein the message includes a tag, and the tag includes a random value.

3. The system of claim 1, wherein the certificate includes the node identifier and a public key for the node without other information identifying the node, and wherein the node identifier is a random value.

4. The system of claim 1, wherein the computer code is further configured to present the certificate whenever the node connects to any node in the P2P network.

5. The system of claim 1, wherein the node is a first node, the certificate is a first certificate, and the computer code is further configured to:
   accept, at the first node, a first connection from a second node, wherein the first node received a second certificate from the second node for verification of an identity of the second node, the first node authenticated the second certificate with a public key of the certificate authority, the second node is included in the nodes, and the second certificate is included in the certificates; and
   drop the first connection in response to receipt of a request to establish a second connection from a requesting node to the first node, wherein the first node also received the second certificate from the requesting node for verification of an identity of the requesting node, and the requesting node is included in the nodes.

6. The system of claim 1, wherein the P2P network includes a distributed hash table (DHT), and wherein the computer code is further configured to limit storage in the DHT based on the certificates.

7. A non-transitory tangible computer readable storage medium comprising logic encoded therein executable with a processor to:
   store a license key in a node of a peer-to-peer (P2P) network, the license key being proof of purchase of a product license of a product associated with the node;
   transmit a message included in the license key to a certificate authority from the node; and
   receive, at the node, a certificate from the certificate authority in response to authentication of the message;
   identify the node in the P2P network with a node identifier included in the certificate; and
   verify identities of a plurality of nodes in the P2P network that communicate with the node based on certificates received from the nodes.

8. The non-transitory tangible computer-readable storage media of claim 7, wherein the message includes a digital signature generated with a license server private key, and wherein authentication of the message includes a verification of the digital signature with a license server public key.

9. The non-transitory tangible computer-readable storage media of claim 7, wherein the message includes a tag, and the tag is based on a random value.

10. The non-transitory tangible computer-readable storage media of claim 7, wherein the node identifier is a random value.

11. The non-transitory tangible computer-readable storage media of claim 7, wherein the logic encoded in the tangible media is further executable to present the certificate when the node joins the P2P network.

12. The non-transitory tangible computer-readable storage media of claim 7, wherein the logic encoded in the tangible media is further executable to accept, at the node, only one connection at a time per respective one of the certificates.

13. The non-transitory tangible computer-readable storage media of claim 7, wherein the logic encoded in the tangible media is further executable to verify authenticity of the certificate when the node retrieves data from the P2P network.

14. A method comprising:
receiving, at a node on a peer-to-peer (P2P) network, a license key from a license server, the license key being proof of purchase of a product;
transmitting a message included in the license key to a certificate authority from the node;
receiving, at the node, a certificate from the certificate authority in response to authentication of the message;
identifying the node in the P2P network based on the certificate; and
accepting connections to the node only from nodes in the P2P network that transmit valid certificates to the node.

15. The method of claim 14, wherein the message includes a digital signature generated with a license server private key, and the authentication of the message includes verification of the digital signature with a license server public key.

16. The method of claim 14, wherein the message includes a tag, and the tag includes a random value.

17. The method of claim 14, wherein identifying the node in the P2P network comprises extracting a node identifier from the certificate and configuring the node identifier as an identity of the node in the P2P network.

18. The method of claim 14, wherein identifying the node in the P2P network comprises transmitting the certificate from the node to at least one node in the P2P network when establishing a connection from the node to the at least one node.

19. The method of claim 14, further comprising accepting, at the node, only one connection at a time per respective one of the certificates received from the nodes.

20. The method of claim 14, wherein the P2P network includes a distributed hash table (DHT), wherein the method further comprises limiting access by one of the nodes to the DHT based on whether the one of the nodes presented one of the certificates and on whether the one of the certificates is valid.

* * * * *